Figure 1:
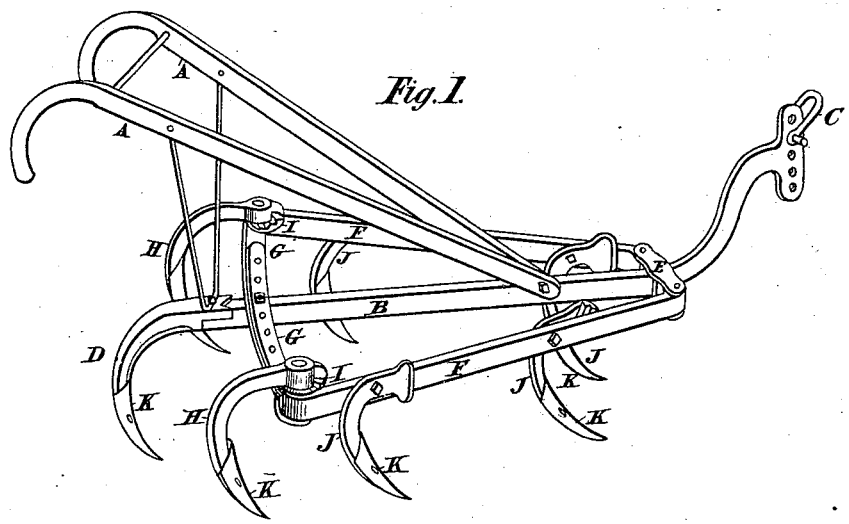

(No Model.)

P. BEELER.
CULTIVATOR.

No. 292,091. Patented Jan. 15, 1884.

WITNESSES.
Frank Pardow,
Geo. D Lee

INVENTOR.
Presley Beeler
by J. G. Hewitt
attorney

United States Patent Office.

PRESLEY BEELER, OF JEFFERSON COUNTY, KENTUCKY.

CULTIVATOR.

SPECIFICATION forming part of Letters Patent No. 292,091, dated January 15, 1884.

Application filed September 21, 1883. (No model.)

*To all whom it may concern:*

Be it known that I, PRESLEY BEELER, a citizen of the United States, residing in the county of Jefferson and State of Kentucky, have invented a certain new and useful Improvement in Cultivators; and I do hereby declare that the following is a full, clear, and exact description of the construction and operation of the same, reference being had to the accompanying drawings, forming part of this specification.

This my invention relates to certain new and useful improvements in cultivators for pulverizing the soil, consisting, first, in a central bar or beam with a clevis in front, and a set of handles screwed thereto in front, with the rear ends supported by metal braces extending down from the handle to the bar and secured thereto by means of a bolt. This central bar is provided with a detachable curved piece or hook on the rear end, to which one of the teeth is attached, and is further provided with a cross-head immediately in front of the handles, to which a set of expanding side bars are hinged, and held in place, when set, by means of flat bars hinged to the rear ends, with the inner ends lapping over each other and slightly curved laterally in the back, with a series of holes in each, and a bolt through them and the bar in the center, to hold the side bars in place when set at any angle required. These side bars are each provided with three sickle-formed hooks, to which the teeth of the cultivator are secured, one in the rear, one on the outside near the end, and one on the inside near the front end. These hooks which are secured to the side bars are made flat, and hinged thereto by means of bolts inserted about three and one-half inches back of the ends, which are slightly widened, and corrugated on the inside to correspond with similar corrugations on the side bars for the purpose of setting the teeth at any required angle. The teeth on the rear end of the side bars are hinged or bolted on the top of the jaw-flange of the adjustable cross-bars, which flanges extend out beyond the boss, and are corrugated on the upper surface, with the ends of the teeth so formed as to catch in the corrugations and hold them when set.

The object of this my invention is to provide a cultivator with adjustable teeth so arranged as to be set at any required angle, in order to be used as a cultivator susceptible of being adjusted to any suitable width, or converted into a harrow, if required. I attain the above object by the mechanism illustrated in the drawings, in which—

Figure 5:
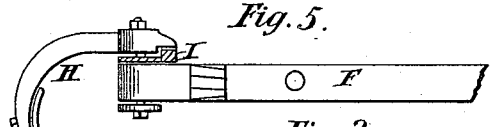
Figure 2:
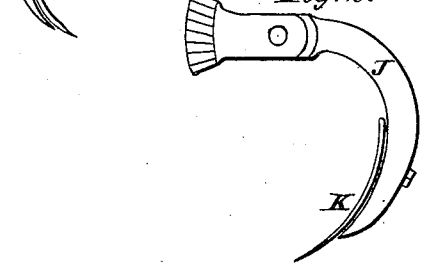
Figure 3:
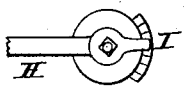
Figure 4:
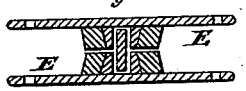

Figure 1 is a perspective view of the machine, showing its construction. Fig. 2 is a flat view of the side-bar hooks to which the teeth are attached, showing the corrugated surface on the end. Fig. 3 is a top view of the corrugated flange of the adjusting-bars. Fig. 4 is a sectional view of the cross-head, showing its general construction. Fig. 5 is a flat view of the adjustable side bars, showing the hinge-joint, corrugated surface, and tooth-hook at the rear end.

Similar letters refer to similar parts throughout the several views.

In the drawings, A A are the handles of the machine, which are made similar to those now in common use, and are secured to the central bar or beam in front, and supported in the rear by braces extending down so as to rest upon, and secured to the central bar by means of a bolt.

B is the central bar or beam, which is made of metal, and in form as shown in the drawings, with a clevis, C, on the end in front, and a tooth-hook, D, in the rear, which is made detachable, so as to be easily removed in case it be necessary to substitute some other device in its place, if required for another purpose.

E is the cross-head, to which the side bars, F, are hinged in front, and is made in two pieces, so as to drop over and clamp the beam-bar from above and below, and is secured thereto by means of a bolt or otherwise.

F F are the adjustable side bars, which are made of metal, with bosses formed on the inside of each end similar to an ordinary strap-hinge, and hinged to the cross-head E at the forward end and to the adjustable bars G G in the rear. These adjusting-bars G are made to extend across and rest upon the beam B, and lap over each other their full length across the machine, with a series of small holes in each, for the purpose of expanding or contracting the hinged side bars, F, in order to increase or diminish the width of the machine, when required.

H H are the rear tooth-hooks on the side bars, F, which are made in form as shown, and secured on the top of the flanges I of the hinge-bosses of the adjusting-bars G, with a small point projecting in front of the bolt to answer as a catch to drop into the catches of a corrugated surface formed on a small extension of the flanges I, in order to permit the tooth-hook to be set at any required angle, and hold it firmly in position when the bolt is screwed up.

J J are the tooth-hooks on the side bars, F, which are made in form as shown in the drawings, with one of them hinged to the outside of the side bars, F, near the rear end, while the other is hinged to the inside near the forward end. These tooth-hooks J J are made in form as shown, with the ends widened to nearly double the width of the bars F, and corrugated on the sides next to the bars, so as to match or fit into corresponding corrugations on the side of the bars F, to hold the teeth in position when set, and enable them to be set at any required angle when hinged to the side bar, F, by means of a bolt through the hook and bar, about two inches back of the corrugations on the end.

K K are the cultivator-teeth which may be made in any suitable form, and secured to the hooks J J and H H by means of bolts or otherwise. Therefore,

What I claim as my invention, and desire to secure by Letters Patent in cultivators, is—

The adjusting cross-bars G G, hinged to the side bars, F, by means of flanges above and below, with the corrugated projection I and tooth-hook H, as above described, in combination with the side bars, F, tooth-hooks J J, and teeth K K, substantially as described, and for the purpose set forth.

PRESLEY BEELER.

Witnesses:
 FRANK PARDON,
 GEO. D. LEE.